United States Patent
Lin et al.

(10) Patent No.: US 10,798,587 B2
(45) Date of Patent: Oct. 6, 2020

(54) METHOD OF USER PROPORTION INVESTIGATION AND POPULATION ESTIMATION IN A REGION FOR MOBILE COMMUNICATION OPERATORS

(71) Applicant: SOUTH CHINA UNIVERSITY OF TECHNOLOGY, Guangdong (CN)

(72) Inventors: Peiqun Lin, Guangdong (CN); Yongwei Lei, Guangdong (CN); Litian Chen, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/622,294

(22) PCT Filed: Dec. 11, 2017

(86) PCT No.: PCT/CN2017/115393
§ 371 (c)(1),
(2) Date: Dec. 13, 2019

(87) PCT Pub. No.: WO2018/227903
PCT Pub. Date: Dec. 20, 2018

(65) Prior Publication Data
US 2020/0213865 A1   Jul. 2, 2020

(30) Foreign Application Priority Data
Jun. 13, 2017 (CN) .......................... 2017 1 0444344

(51) Int. Cl.
*H04M 1/274* (2006.01)
*H04W 16/18* (2009.01)
(Continued)

(52) U.S. Cl.
CPC .......... *H04W 16/18* (2013.01); *G06F 16/285* (2019.01); *G06Q 30/0205* (2013.01);
(Continued)

(58) Field of Classification Search
CPC ....... H04W 84/12; H04W 4/80; H04W 12/06; H04W 12/08; H04W 4/021; H04W 36/245
(Continued)

(56) References Cited

U.S. PATENT DOCUMENTS

| 6,636,803 B1 | 10/2003 | Hartz, Jr. et al. |
| 2020/0107152 A1* | 4/2020 | Dotan-Cohen ........ G06Q 10/10 |

FOREIGN PATENT DOCUMENTS

| CN | 105376709 | 3/2016 |
| CN | 105488120 | 4/2016 |

(Continued)

OTHER PUBLICATIONS

"International Search Report (Form PCT/ISA/210) of PCT/CN2017/115393," dated Feb. 24, 2018, with English translation thereof, pp. 1-4.

*Primary Examiner* — Tu X Nguyen
(74) *Attorney, Agent, or Firm* — JCIPRNET

(57) ABSTRACT

A method of user proportion investigation and population estimation in a region for mobile communication operators, including the following steps: S1. completing a WiFi network construction in the region; S2. a mobile phone user in the region sending a verification code request for WiFi login to a background by using a client; S3. the background receiving the request from the user, and recording a mobile phone number and a request time of the user; S4. the background completing an identification and classification processing of the operator of the mobile phone number, and obtaining the user proportion in the region for the communication operators within a set period of time; and S5. calculating a population amount in the region according to a number of mobile phone signaling provided by one mobile communication operator thereof and the user proportion in (Continued)

the region for the corresponding communication operator obtained in S4.

5 Claims, 2 Drawing Sheets

(51) Int. Cl.
| | | |
|---|---|---|
| | *G06Q 30/02* | (2012.01) |
| | *H04W 12/06* | (2009.01) |
| | *G06F 16/28* | (2019.01) |
| | *H04W 4/021* | (2018.01) |
| | *H04W 8/24* | (2009.01) |
| | *H04W 24/02* | (2009.01) |
| | *H04W 4/029* | (2018.01) |
| | *H04W 84/12* | (2009.01) |

(52) U.S. Cl.
CPC .......... *H04W 4/021* (2013.01); *H04W 4/029* (2018.02); *H04W 8/24* (2013.01); *H04W 12/06* (2013.01); *H04W 24/02* (2013.01); *H04W 84/12* (2013.01)

(58) Field of Classification Search
USPC ....................................................... 455/412.1
See application file for complete search history.

(56) References Cited

FOREIGN PATENT DOCUMENTS

| | | |
|---|---|---|
| CN | 106295787 | 1/2017 |
| CN | 106455058 | 2/2017 |
| CN | 107371158 | 11/2017 |

\* cited by examiner

METHOD OF USER PROPORTION INVESTIGATION AND POPULATION ESTIMATION IN A REGION FOR MOBILE COMMUNICATION OPERATORS

CROSS-REFERENCE TO RELATED APPLICATION

This application is a 371 of international application of PCT application serial no. PCT/CN2017/115393, filed on Dec. 11, 2017, which claims the priority benefit of China application no. 201710444344.5, filed on Jun. 13, 2017. The entirety of each of the above mentioned patent applications is hereby incorporated by reference herein and made a part of this specification.

TECHNICAL FIELD

The present invention relates to the field of communication, and more specifically, relates to a method of user proportion investigation and population estimation in a region for mobile communication operators.

BACKGROUND

With the rapid development of the social economy and the continuous advancement of science and technology, people are paying more and more attention to social public safety issues, especially safety issues in densely populated areas. Strengthening the safety management of densely populated areas and rationally controlling the capacity of densely populated areas are keys to reducing the occurrence of safety accidents. Traditional counting methods based on manual counting are laborious and unsuitable for scenes with dense population; for the population counting methods based on video images, in a scene with high population density, model-based detection is easy to fail and unable to accurately obtain the number of people in the scene. It can be seen that traditional population counting methods based on manual counting and modern population counting methods based on video image are both unable to solve the problem of population counting in densely populated places.

The arrival of the era of big data makes mobile phones an ideal data collector, providing favorable technical support for data statistics and making it possible to analyze a regional crowd aggregation situation by combining with mobile phone signaling data. However, in order to obtain data from all communication operators, a lot of manpower and resources are required, making it economically unsuitable. Therefore, the present invention aims to realize the analysis of the regional crowd aggregation situation by using the data of partial communication operators, and proposes a method of user proportion investigation and population estimation in a region for mobile communication operators.

SUMMARY OF THE INVENTION

In order to overcome the drawbacks of the prior art, the present invention solves the technical problems and employs a technical solution that provides a method of user proportion investigation and population estimation in a region for mobile communication operators. The specifics of the technical solution are as follows.

A method of user proportion investigation and population estimation in a region for mobile communication operators, includes the following steps:

S1. completing a WiFi network construction in the region;

S2. a mobile phone user in the region sending a verification code request for WiFi login to a background by using a client;

S3. the background receiving the request from the user, and recording a mobile phone number and a request time of the user;

S4. the background completing an identification and classification processing of the operator of the mobile phone number, and obtaining the user proportion in the region for the communication operators within a set period of time; and S5. calculating a population amount in the region according to a number of mobile phone signaling provided by one mobile communication operator thereof and the user proportion in the region for the corresponding communication operator obtained in S4.

Further, the WiFi network employs a WiFi identity authentication method based on verification code, and the authentication method is independent on a specific protocol and a specific WiFi device manufacturer.

Further, the mobile phone user sends the verification code request to the background, and after the client connects to a WiFi hotspot in the region, a browser of the client is directed to an identity authentication page, and the user inputs a mobile phone number to obtain the verification code.

Further, the background completes the identification and classification processing of the operator of the mobile phone number and obtains the user proportion, the background identifies the operator that records the mobile phone number in S3, and obtains the user proportion in the region for each communication operator in the region within the set period of time.

The calculation of the population amount of S5, divides the number of mobile phone signaling of one mobile communication operator in the region within the set period of time by the user proportion measured in the region for the operator, obtaining an estimation amount of population aggregation in the region during the time period.

In comparison with the prior art, advantages and beneficial effects of the present invention: the method of the present invention is simple and easy to implement, and the estimation of a regional crowd aggregation amount can be realized by using the data of partial communication operators. Based on this, it is possible to analyze the crowd aggregation situation in a region, provide accurate data to supervisors in time, and help supervisors make scientific and reasonable decisions to reduce the occurrence of safety incidents. Therefore, the present invention has great promotion and application value.

DETAILED DESCRIPTION OF THE PREFERRED EMBODIMENT

The present invention will be further described below with reference to the specific embodiments, however, the embodiments of the present invention are not limited thereto.

A method of user proportion investigation and population estimation in a region for mobile communication operators, the present method is applied in a region covered with WiFi that uses a verification code approach to perform WiFi identity authentication, and specifics steps of the present method are as follows:

S1. Completing a WiFi network construction in the region, the WiFi network uses a WiFi identity authentication method based on the verification code approach, and the authentication method is independent on a specific protocol and a specific WiFi device manufacturer.

S2. A mobile phone user in the region sending a verification code request for WiFi login to a background by using a client. After the mobile phone user connects to a WiFi hotspot in the region using the client, a browser of the client is directed to an identity authentication page, and the user inputs a mobile phone number to obtain the verification code.

S3. The background receiving the request from the user, and recording a mobile phone number and a request time of the user. The recorded mobile phone number and request time are used in S4, calculating a user proportion in the region for different operators within a certain period of time.

S4. The background completing an identification and classification processing of the operator of the mobile phone number, and obtaining the user proportion in the region for the communication operators within a certain period of time. The background uses a mobile phone number attribution database and area code to identify the attribution and operator of the mobile phone number, counts a user number of each major communication operator in a region within a certain period of time, and accordingly, calculates a user proportion in the region for each communication operator within the period of time.

S5. Calculating a population amount in the region according to a number of mobile phone signaling provided by one mobile communication operator and the user proportion in the region for the corresponding communication operator obtained in S4. The user proportion in the region for each communication operator within the certain period of time is obtained from S4, the number of mobile phone signaling of one mobile communication operator in the region within the certain period of time is queried, the number of signaling is divided by the proportion of the operator measured in the region, obtaining an estimation amount of population aggregation in the region during the time period.

Figure 1:
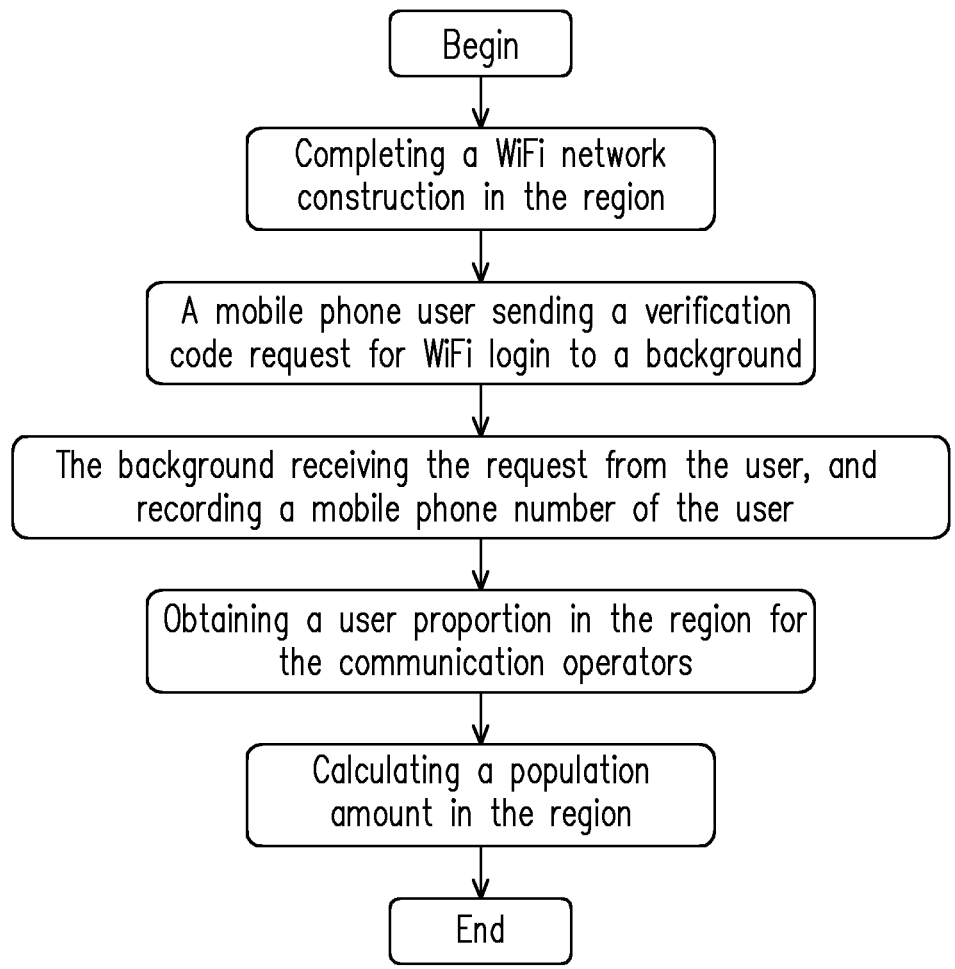
FIG. 1 is a working flow diagram of an embodiment.

This embodiment runs a test for Guangzhou Railway Station, and its implementation steps is as shown in FIG. 1. Firstly, completing a WiFi network construction in a target region, and the WiFi network uses a WiFi identity authentication method based on the verification code approach;

then, the mobile phone user in the region sends the verification code request for WiFi login to the background;

then, the background receives the request of the mobile phone user, and records the mobile the user's mobile phone number and the request time;

TABLE 1

Partial data sample of Guangzhou Railway Station's mobile phone user request records

| Region | Number | Operator | Attribution of Number | Time |
|---|---|---|---|---|
| Railway Station West Square | 180****7191 | China Telecom | Guangdong Guangzhou | 2017 Jan. 12 08:03:19 |
| Railway Station West Square | 182****8510 | China Mobile | Sichuan Dazhou | 2017-01-12 08:04:59 |
| Railway Station West Square | 136****1574 | China Mobile | Chongqing Chongqing | 2017-01-12 08:08:38 |

TABLE 1-continued

Partial data sample of Guangzhou Railway Station's mobile phone user request records

| Region | Number | Operator | Attribution of Number | Time |
|---|---|---|---|---|
| Railway Station West Square | 150****8985 | China Mobile | Guangdong Dongguan | 2017-01-12 08:24:46 |
| Railway Station West Square | 158****8022 | China Mobile | Qinghai Haidong | 2017 Jan. 12 09:02:52 |
| Railway Station West Square | 186****8213 | China Unicom | Guangdong Guangzhou | 2017 Jan. 12 09:44:31 |
| Railway Station East Square | 132****1913 | China Unicom | Guangdong Foshan | 2017 Jan. 12 10:25:29 |
| Railway Station East Square | 188****2974 | China Mobile | Guangdong Guangzhou | 2017 Jan. 12 10:50:53 |
| Railway Station West Square | 183****5774 | China Mobile | Sichuan Nanchong | 2017 Jan. 12 11:25:40 |
| Railway Station West Square | 159****2465 | China Mobile | Inner Mongolia Baotou | 2017 Jan. 12 11:35:04 |
| Railway Station West Square | 189****8917 | China Telecom | Guangdong Guangzhou | 2017 Jan. 12 11:35:07 |
| Railway Station West Square | 135****6299 | China Mobile | Henan Zhoukou | 2017 Jan. 12 12:37:18 |
| Railway Station West Square | 182****5696 | China Mobile | Guangdong Guangzhou | 2017 Jan. 12 12:45:23 |
| Railway Station West Square | 132****0388 | China Unicom | Guangdong Guangzhou | 2017 Jan. 12 12:52:44 |
| Railway Station West Square | 135****9275 | China Mobile | Guangdong Shantou | 2017 Jan. 12 14:01:05 |
| Railway Station West Square | 138****6943 | China Mobile | Guangdong Guangzhou | 2017 Jan. 12 14:13:13 |
| Railway Station West Square | 135****8402 | China Mobile | Guangdong Shenzhen | 2017 Jan. 12 14:19:34 |
| Railway Station West Square | 183****5389 | China Mobile | Jiangsu Xuzhou | 2017 Jan. 12 16:17:09 |
| Railway Station West Square | 182****5239 | China Mobile | Shanxi Yuncheng | 2017 Jan. 12 16:17:33 |
| Railway Station West Square | 155****8036 | China Unicorn | Guangdong Zhongshan | 2017 Jan. 12 19:26:26 |
| Railway Station West Square | 135****6476 | China Mobile | Hunan Hengyang | 2017 Jan. 12 19:54:40 |
| Railway Station East Square | 134****9391 | China Mobile | Guangdong Shenzhen | 2017 Jan. 12 19:58:02 |
| Railway Station West Square | 156****7713 | China Unicorn | Guangdong Guangzhou | 2017 Jan. 12 20:09:32 |
| Railway Station West Square | 135****4386 | China Mobile | Guangdong Guangzhou | 2017 Jan. 12 20:32:00 |
| Railway Station East Square | 159****7741 | China Mobile | Jiangxi Shangrao | 2017 Jan. 12 20:51:32 |
| Railway Station East Square | 186****3209 | China Unicorn | Sichuan Nanchong | 2017 Jan. 12 21:08:28 | then, the background completes the identification and classification processing of the operator of the mobile phone number. A data of seven days from Jan. 11, 2017 to Jan. 17, 2017 is taken as an example data. The form of recorded data requested by mobile phone users of Guangzhou Railway Station is shown in Table 1. In order to make the statistics more representative, the sample size of this example is calculated according to the following formula:

$$N=Z^2 \times (P \times (1-P))/E^2$$

N: is a sample size;
Z: is a counting amount, when a confidence degree is 95%, z=1.96; when the confidence degree is 90%, z=1.64;
E: is a deviation value;
P: is a probability value.

Figure 2:
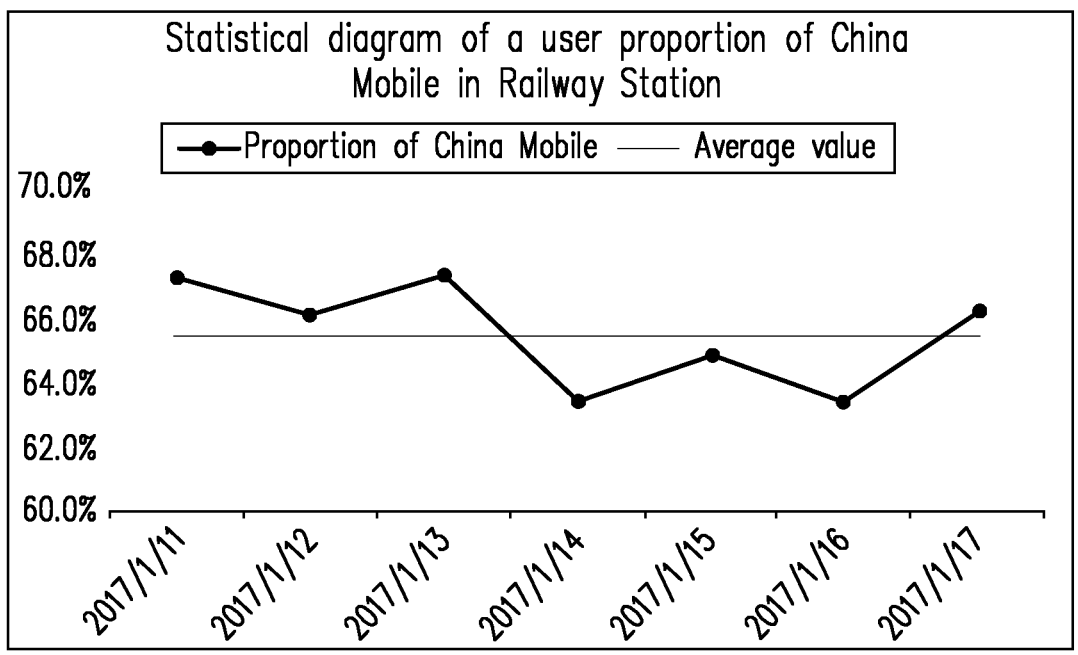
FIG. 2 is a statistical diagram of a user proportion of China Mobile in Guangzhou Railway Station.

In this example, when Z=1.96, E=3% and P=0.7, N=896. Specifically, in the experiment, a total of 905 valid records were counted, meeting the calculation requirements. Through background data processing, only one piece of data is counted for the same mobile phone number continuously sending verification message in a short period of time, operator identification is performed for the statistically completed mobile phone number at the same time, and the proportion of the Chinese Mobile communication operator in the region is calculated accordingly. During the period, the user number of China Mobile in the region was stable at around 65%, and it can be considered that the user proportion of Chinese mobile operator in the region during the period was 65%. The calculation result of the proportion of the user number of China Mobile is shown in FIG. 2.

TABLE 2

Partial data sample of an estimation of population amount in a region of Guangzhou Railway Station

| Time | Signaling data | User proportion | Estimation of population amount |
|---|---|---|---|
| 2017/1/18 | 17105 | 0.65 | 26315 |
| 2017/1/18 0:05 | 17999 | 0.65 | 27691 |
| 2017/1/18 0:10 | 18788 | 0.65 | 28905 |
| 2017/1/18 0:15 | 19489 | 0.65 | 29983 |
| 2017/1/18 0:20 | 20224 | 0.65 | 31114 |
| 2017/1/18 0:25 | 20489 | 0.65 | 31522 |
| 2017/1/18 0:30 | 20563 | 0.65 | 31635 |
| 2017/1/18 0:35 | 20596 | 0.65 | 31686 |
| 2017/1/18 0:40 | 20563 | 0.65 | 31635 |
| 2017/1/18 0:45 | 20614 | 0.65 | 31714 |
| 2017/1/18 0:50 | 20560 | 0.65 | 31631 |
| 2017/1/18 0:55 | 20336 | 0.65 | 31286 |
| 2017/1/18 1:00 | 19818 | 0.65 | 30489 |
| 2017/1/18 1:05 | 19528 | 0.65 | 30043 |
| 2017/1/18 1:10 | 18551 | 0.65 | 28540 |
| 2017/1/18 1:15 | 17864 | 0.65 | 27483 |
| 2017/1/18 1:20 | 17533 | 0.65 | 26974 |
| 2017/1/18 1:25 | 16566 | 0.65 | 25486 |
| 2017/1/18 1:30 | 16002 | 0.65 | 24618 |
| 2017/1/18 1:35 | 16615 | 0.65 | 25562 |
| 2017/1/18 1:40 | 16464 | 0.65 | 25329 |
| 2017/1/18 1:45 | 16177 | 0.65 | 24888 |
| 2017/1/18 1:50 | 16202 | 0.65 | 24926 |
| 2017/1/18 1:55 | 15361 | 0.65 | 23632 |

Figure 3:
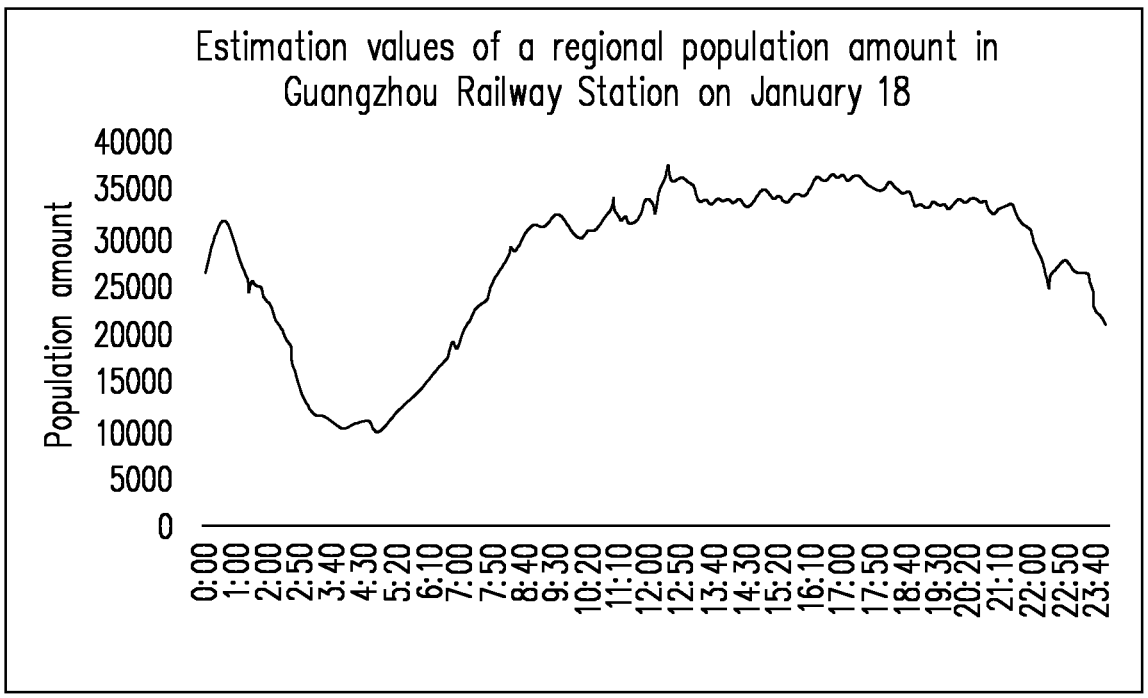
FIG. 3 is an estimation diagram of a regional population amount in Guangzhou Railway Station on January 18.

Afterwards, according to the number of mobile phone signaling in the region on Jan. 18, 2017 provided by the mobile operator, and the proportion of users of mobile operator in the region obtained in S4 is 65%, according to a calculation formula "regional population amount=signaling data/user ratio", it can calculate a population amount of the region in the period of time. An estimation sample of partial regional population amount is shown in Table 2. An estimation value of population of Guangzhou Railway Station on January 18 is shown in FIG. 3.

The above embodiments are preferred implementation of the present invention, but the implementation of the present invention is not limited to the embodiments. Any other changes, modifications, substitutions, combinations and simplifications made without departing from the spirit and principle of the present invention, are equivalent replacement means that are included in the scope of the present invention.

What is claimed is:

1. A method of user proportion investigation and population estimation in a region for mobile communication operators, comprising:
    S1. completing a WiFi network construction in the region;
    S2. a mobile phone user in the region sending a verification code request for WiFi login to a background by using a client;
    S3. the background receiving the request from the user, and recording a mobile phone number and a request time of the user;
    S4. the background completing an identification and classification processing of the operator of the mobile phone number, and obtaining the user proportion in the region for the communication operators within a set period of time; and
    S5. calculating a population amount in the region according to a number of mobile phone signaling provided by one mobile communication operator thereof and the user proportion in the region for the corresponding communication operator obtained in S4.

2. The method of user proportion investigation and population estimation in the region for mobile communication operators according to claim 1, wherein the WiFi network employs a verification code approach, and WiFi identity authentication is independent on a specific protocol and a specific WiFi device manufacturer.

3. The method of user proportion investigation and population estimation in the region for mobile communication operators according to claim 1, wherein the mobile phone user sends the verification code request to the background, and after the client connects to a WiFi hotspot in the region, a browser of the client is directed to an identity authentication page, and the user inputs a mobile phone number to obtain the verification code.

4. The method of user proportion investigation and population estimation in the region for mobile communication operators according to claim 1, wherein comprises: the background identifies the operator that records the mobile phone number in S3, and obtains the user proportion in the region for each communication operator within the set period of time.

5. The method of user proportion investigation and population estimation in the region for mobile communication operators according to claim 1, wherein calculating the population amount in S5 comprises: dividing the number of mobile phone signaling of one mobile communication operator in the region within the set period of time by the user proportion measured in the region for the operator to obtain an estimation amount of population aggregation in the region.

* * * * *